United States Patent [19]

Mookherjee et al.

[11] 3,977,419

[45] Aug. 31, 1976

[54] TOBACCO ARTICLE COMPRISING A FLAVORING COMPOSITION SELECTED FROM BUTANONE DERIVATIVES AND THE PROCESS FOR MAKING THE SAME

[75] Inventors: Braja Dulal Mookherjee, Matawan; Robert Walter Trenkle, Bricktown; Manfred Hugo Vock, Locust, all of N.J.; Edward J. Shuster, Brooklyn, N.Y.

[73] Assignee: International Flavors & Fragrances Inc., New York, N.Y.

[22] Filed: May 9, 1975

[21] Appl. No.: 576,106

Related U.S. Application Data

[63] Continuation-in-part of Ser. No. 462,748, April 22, 1974, Pat. No. 3,928,645, which is a continuation-in-part of Ser. No. 386,320, Aug. 7, 1973, Pat. No. 3,872,031.

[52] U.S. Cl. ............................. 131/17 R; 131/144
[51] Int. Cl.² ........................................... A24B 3/12
[58] Field of Search ......................... 131/17, 2, 144

[56] References Cited
OTHER PUBLICATIONS

"Dangerous Properties of Industrial Materials," by Sax; Third Edition Reinhold Book Corp., 1968 Edition.

*Primary Examiner*—Robert W. Michell
*Assistant Examiner*—V. Millin
*Attorney, Agent, or Firm*—Arthur L. Liberman; Harold Haidt

[57] ABSTRACT

Described is a process comprising adding to tobacco itself, or to homogenized or reconstituted tobacco (for subsequent incorporation into smoking articles along with tobacco blend) an amount sufficient to alter the flavor or aroma of the ultimate tobacco mixture of 4-(2,6,6-trimethyl-1,3-cyclohexadien-1-yl)-2-butanone and/or
4-(6,6-dimethyl-2-methylene-3-cyclohexen-1-yl)-2-butanone.

8 Claims, No Drawings

TOBACCO ARTICLE COMPRISING A FLAVORING COMPOSITION SELECTED FROM BUTANONE DERIVATIVES AND THE PROCESS FOR MAKING THE SAME

This application is a continuation-in-part application of copending application for U.S. Pat. Ser. No. 462,748, filed on Apr. 22, 1974 now U.S. Pat. No. 3,928,645, issued on Dec. 23, 1975, which in turn is a continuation-in-part of application for U.S. Pat. Ser. No. 386,320, filed on Aug. 7, 1973, now U.S. Pat. No. 3,872,031 issued on Mar. 18, 1975.

BACKGROUND OF THE INVENTION

This invention relates to novel tobacco products, novel tobacco flavoring compositions, and processes for producing same, and has for an object the provision of a composition and process for improving the flavor and aroma of tobacco and tobacco smoke and, (in one aspect of our invention) at the same time, reducing the tar and nicotine delivery of a smoking article.

It is well known in the tobacco art that the flavor and aroma of the tobacco product and the smoke from the tobacco are very important considerations insofar as the ultimate consumer is concerned. Considerable efforts have been and are being exerted by the manufacturers of tobacco products to provide a product that will be both acceptable to the consumer, particularly as regards flavor and aroma characteristics and reduction of tar and nicotine delivery on smoking.

Homogenized (or reconstituted) tobacco has been used by the tobacco industry in the manufacture of smoking articles having reduced tar and nicotine delivery on smoking. It has been a goal in the tobacco industry to prepare blends of domestic tobaccos, oriental tobaccos and "homogenized tobacco" (which is usually a blend of burley and/or bright tobacco stems, dust and/or scrap) in order to provide smoking tobacco which has a pleasant flavor and aroma before and during smoking. However, notwithstanding that "homogenized tobacco" is used in conjunction with the more expensive tobaccos, such a procedure is costly and may at times become prohibitive in the event that certain types of tobacco may be in short supply. Accordingly, there has been considerable work relating to substances which can be used to impart flavors to various tobacco blends which include the aforementiond "homogenized tobacco." These substances are used to supplement natural materials some of which, as stated above, may be in short supply, and to provide more uniform properties to the finished product. Use of unflavored homogenized tobacco has been found to detract from the organoleptic properties of regular tobacco blends.

Sweet, natural tobacco notes are particularly desirable for many uses concerning the flavoring of tobacco products; both prior to and on smoking.

Firmenich et al. British Pat. No. 1,240,309 published on July 21, 1971, describes an improved tobacco product containing ketones having the formula:

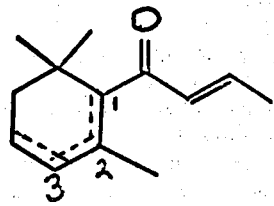

wherein at least one of the dashed lines represents a double bond and which compound contains one double bond in one of the positions 1 and 2 or two double bonds in positions 1 and 3. The disclosure of the use of these compounds in tobacco products is set forth on page 1, line 35.

Similarly, German Offenlegungsschrift 2,353,468 published on May 9, 1974 describes compounds having the structure:

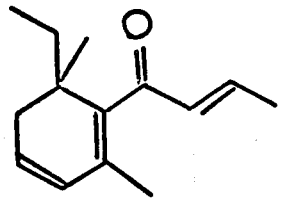

as being useful as tobacco flavorants.

U.S. Pat. No. 3,268,589 issued on Aug. 23, 1966 discloses a technique for enhancing the flavor of tobacco by adding thereto a small amount of 4-(2-butenylidene)-3,5,5-trimenthyl-2-cyclohexene-1-on having the structure:

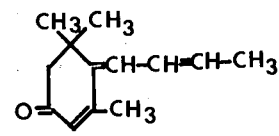

Cigarettes treated using the above compound are indicated in U.S. Pat. No. 3,268,589 to have "desired and pleasing peppery and spicy odor which is detectible to some extent when the cigarette is in its package, but which is particularly detectible and pleasing in the main and side smoke streams when the cigarette is smoked."

In accordance with U.S. Pat. No. 3,828,795 issued on Aug. 13, 1974, the flavor and/or aroma of tobacco or tobacco products is improved by adding thereto a small amount of a compound having the following general formula:

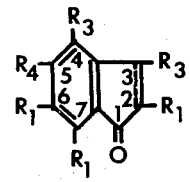

where each of the R groups is hydrogen or alkyl or one to four carbon atoms and wherein a double bond may be present between the $C_2$ and $C_3$ carbon atoms as indicated by the broken line.

However, compounds having the structure of the butanone derivative of the instant invention have never been described in the literature; and the imparting to smoking articles in the main and side stream of sweet and natural notes by incorporating such compounds into tobacco per se, or into homogenized tobacco prior to further incorporation with blended tobacco into smoking articles has never been disclosed.

The present invention relates to novel methods and compositions using 4-(2,6,6-trimethyl-1,3-cyclohexadien-1-yl)-2-butanone and/or 4-(6,6-dimethyl-2-methylene-3-cyclohexen-1-yl)-2-butanone to alter the flavor and/or aroma of tobacco.

According to this invention novel tobacco compositions having sweet natural tobacco notes are provided by using 4-(2,6,6-trimethyl-1,3-cyclohexadien-1-yl)-2-butanone and/or 4-(6,6-dimethyl-2-methylene-3-cyclohexen-1-yl)-2-butanone in tobacco itself or in homogenized tobacco prior to blending with tobacco per se.

These butanone compounds may be represented by the formula:

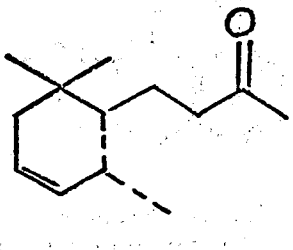

wherein one of the dashed lines represents a carbon-carbon double bond, and the other dashed line represents a carbon-carbon single bond.

The 4-(2,6,6-trimethyl-1,3-cyclohexadien-1-yl)-2-butanone and/or 4-(6,6-dimethyl-2-methylene-3-cyclohexen-1-yl)-2-butanone of our invention are capable of supplying and/or potentiating certain flavor and aroma notes usually lacking in many tobaccos, e.g., sweet, natural tobacco notes.

Our invention provides an organoleptically improved smoking tobacco product and additives therefor, as well as methods of making the same which overcome the problems heretofore encountered and in which specific desired natural and/or sweet flavoring characteristics of tobacco are created or enhanced and may be readily controlled and maintained at the desired uniform level regardless of variations in the tobacco components of the blend.

This invention further provides improved tobacco additives and methods whereby various desirable natural and/or sweet flavoring characteristics may be imparted to smoking tobacco products and may be readily varied and controlled to produce the desired uniform flavoring characteristics.

In carrying out one aspect of our invention we add directly to smoking tobacco materials or a suitable substitute therefor (e.g., dried lettuce leaves) an aroma and flavor additive containing as an active ingredient one or both of the following materials:
4-(2,6,6-trimethyl-1,3-cyclohexadien-1-yl)2-butanone and/or
4-(6,6-dimethyl-2-methylene-3-cyclohexen-1-yl)-2-butanone In addition to the 4-(2,6,6-trimethyl-1,3-cyclohexadien-1-yl)-2-butanone and/or 4-(6,6-dimethyl-2-methylene-3-cyclohexen-1-yl)-2-butanone of our invention other flavoring and aroma additives may be added to the smoking tobacco material or substitute therefor either separately or in mixture with the 4-(2,6,6-trimethyl-1,3-cyclohexadien-1-yl)-2-butanone and/or 4-(6,6-dimethyl-2-methylene-3-cyclohexen-1-yl)-2-butanone as follows:

I. Synthetic Materials
Beta-Ethyl Cinnamaldehyde
Eugenol
Dipentene
Maltol
Ethyl Maltol
Delta Undecalactone
Delta Decalactone
Benzaldehyde
Amyl Acetate
Ethyl Butyrate
Ethyl Valerate
Ethyl Acetate
2-Hexenol-1,2-methyl-5-isopropyl-1,3-nonadiene-8-one
2,6-Dimethyl-2,6-undecadiene-10-one
2-Methyl-5-isopropyl acetophenone
2-Hydroxy-2,5,5-8a-tetramethyl-1-(2-hydroxyethyl)-decahydronaphthalene
Dodecahydro-3a-6,6,9a-tetramethyl naphtho(2,1-b)-furan
4-Hydroxy hexanoic acid, gamma lactone
Polyisoprenoid hydrocarbons defined in Example V of U.S. Pat. No. 3,589,372 issued on June 29, 1971
II. Natural Oils
Celery seed oil
Coffe Extract
Bergamot Oil
Cocoa Extract
Nutmeg Oil
Origanum Oil An aroma and flavoring concentrate containing 4-(2,6,6-trimethyl-1,3-cyclohexadien-1-yl)-2-butanone and/or 4-(6,6-dimethyl-2-methylene-3-cyclohexen-1yl)-2-butanone and, if desired, one or more of the above indicated additional flavoring additives may be added to the smoking tobacco material, to the filter or to the leaf or paper wrapper. The smoking tobacco material may be shredded, cured, cased and blended tobacco material or reconstituted tobacco material or tobacco substitutes (e.g., lettuce leaves) or mixtures thereof. The proportions of flavoring additives may be varied in accordance with taste but insofar as enhancement or the imparting of natural and/or sweet notes, we have found that satisfactory results are obtained if the proportion by weight of the sum total of 4-(2,6,6-trimethyl-1,3-cyclohexadien-1-yl)-2-butanone and/or 4-(6,6-dimethyl-2-methylene-3-cyclohexen-1-yl)-2-butanone to smoking tobacco material is between 10 ppm and 50 ppm (.001%-.005%) of the active ingredients to the smoking tobacco material. We have further found that satisfactory results are obtained if the proportion by weight of the sum total of 4-(2,6,6-trimethyl-1,3-cyclohexadien-1-yl)-2-butanone and/or 4-(6,6-dimethyl-2-methylene-3-cyclohexen-1-yl)-2-butanone used to flavoring material is between 1% and 10%.

Any convenient method for incorporating the 4-(2,6,6-trimethyl-1,3-cyclohexadien-1-yl)-2-butanone and/or 4-(6,6-dimethyl-2-methylene-3-cyclohexen-1-yl)-2-butanone in the tobacco product may be employed. Thus, the 4-(2,6,6-trimethyl-1,3-cyclohexadien-1-yl)-2-butanone and/or 4-(6,6-dimethyl-2-methylene-3-cyclohexen-1-yl)-2-butanone taken alone or along with other flavoring additives may be dissolved in a suitable solvent such as ethanol, pentane, diethyl ether and/or other volatile organic solvents and the resulting solution may either be spread on the cured, cased and blended tobacco material or the tobacco material may be dipped into such solution. Under certain circumstances, a solution of the 4-(2,6,6-trimethyl-1,3-cyclohexadien-1-yl)-2-butanone and/or 4-(6,6- dimethyl-2-methylene-3-cyclohexen-1-yl)-2-butanone taken alone or taken further together with other flavoring additives as set forth above, may be applied by means of a suitable applicator such as a brush or roller on the paper or leaf wrapper for the smoking product, or it may be applied to the filter by either spraying, or dipping or coating.

Furthermore, it will be apparent that only a portion of the tobacco or substitute therefor need be treated and the thus treated tobacco may be blended with other tobaccos before the ultimate tobacco product is formed. In such cases, the tobacco treated may have the 4-(2,6,6-trimethyl-1,3-cyclohexadien-1-yl)-2-butanone and/or 4-(6,6-dimethyl-2-methylene-3-cyclohexen-1-yl)-2-butanone in excess of the amounts or concentrations above indicated so that when blended with other tobaccos, the final product will have the percentage within the indicated range.

In accordance with one specific example of our invention an aged, cured and shredded domestic burley tobacco is spread with a 20% ethyl alcohol solution of a mixture of 4-(2,6,6-trimethyl-1,3-cyclohexadien-1-yl)-2-butanone and/or 4-(6,6-dimethyl-2-methylene-3-cyclohexen-1-yl)-2-butanone in an amount to provide a tobacco composition containing 20 ppm by weight of 4-(2,6,6-trimethyl-1,3-cyclohexadien-1-yl)-2-butanone and/or 4-(6,6-dimethyl-2-methylene-3-cyclohexen-1-yl)-2-butanone on a dry basis. Thereafter, the alcohol is removed by evaporation and the tobacco is manufactured into cigarettes by the usual techniques. The cigarette when treated as indicated has a desired and pleasing aroma which is detectable in the main and side smoke streams when the cigarette is smoked. This aroma is described as a "sweet natural tobacco aroma."

While our invention is particularly useful in the manufacture of smoking tobacco, such as cigarette tobacco, cigar tobacco and pipe tobacco, other tobacco products formed from sheeted tobacco dust or fines may also be used. Likewise the 4-(2,6,6-trimethyl-1,3-cyclohexadien-1-yl)-2-butanone and/or 4-(6,6-dimethyl-2-methylene-3-cyclohexen-1-yl)-2-butanone of our invention can be incorporated with materials such as filter tip materials, seam paste, packaging materials and the like which are used along with tobacco to form a product adapted for smoking. Furthermore, the 4-(2,6,6-trimethyl-1,3-cyclohexadien-1-yl)-2-butanone and/or 4-(6,6-dimethyl-2-methylene-3-cyclohexen-1-yl)-2-butanone can be added to certain tobacco substitutes of natural or synthetic origin (e.g., dried lettuce leaves) and, accordingly, by the term "tobacco" as used throughout this specification is meant any composition intended for human consumption by smoking or otherwise, whether composed of tobacco plant parts or substitute materials or both.

In addition, it has been found that the butanone derivatives of our invention when incorporated into homogenized tobacco sheet (which, in turn, is ordinarily admixed with standard tobacco prior to the manufacture thereof into smoking articles, e.g., cigarettes and cigars) also imparts a flavor and aroma both before and during smoking which many smokers consider to be desirable in smoking products.

In accordance with this aspect of our invention, the butanone derivatives of our invention 4-(2,6,6-trimethyl-1,3-cyclohexadien-1-yl)-2-butanone and/or 4-(6,6-dimethyl-2-methylene-3-cyclohexen-1-yl)-2-butanone is added to homogenized tobacco in amounts of about 10–500 parts per million (ppm) based on dry weight of the final smoking article into which said homogenized tobacco is incorporated. Preferably, the amount of additive is between about 20 and 100 ppm by weight in order to provide an ultimate tobacco product having a desired flavor and aroma. However, the amount used will depend upon the amount of flavor and aroma desired and the particular compound or mixture thereof that is used.

The butanone derivative may also be incorporated at any step in the production of the homogenized tobacco sheet, but it is preferably added after aging, curing and shredding and before the homogenized tobacco is formed into sheets. Likewise, it will be apparent that only a portion of the homogenized tobacco composition need be treated and the thus treated homogenized tobacco may be blended with other components before combining the homogenized tobacco with other tobaccos in order to produce therefrom cigarettes or other smoking articles. In such cases, the homogenized tobacco composition treated may have the tricyclene-9-butenone in excess of the amounts above-indicated so that when blended with other components and then with other tobaccos, the final product will have the percentage within the indicated range.

In accordance with a second specific embodiment of this invention, a 50:50 (weight:weight) mixture of tobacco scraps and Virginia stems is sprayed with a one percent ethyl alcohol solution of 4-(2,6,6-trimethyl-1,3-cyclohexadien-1-yl)-2-butanone in an amount to provide a tobacco containing 50 ppm by weight of the 4-(2,6,6-trimethyl-1,3-cyclohexadien-1-yl)-2-butanone on a dry basis. Thereafter, the alcohol is removed by evaporation and 10% by weight of a 1:1:1 mixture of glycerine, carboxymethyl cellulose and diammonium phosphate, is added and the homogenized tobacco is manufactured into sheets by the usual techniques. The sheets are then admixed in a ratio of 15:85 (wt:wt) with Burley tobacco and the resulting mixture is formulated into cigarettes by the usual techniques. It has been found that the cigarettes when prepared as indicated have a desired and pleasing flavor, an aroma which to some people is described as sweet and natural tobacco-like and is detectible and pleasing in the main and side smoke stream when the cigarette is smoked.

The butanone derivative of this invention may be applied to the particles of homogenized tobacco or to the homogenized tobacco sheet by spraying, dipping, or otherwise, utilizing suitable suspensions or solutions of the butanone derivative. Thus, water or volatile organic solvents, such as alcohol, ether, acetone, volatile hydrocarbons and the like, may be used as the carrying medium for the 4-(2,6,6-trimethyl-1,3-cyclohexadien-1-yl)-2-butanone and/or 4-(6,6-dimethyl-2-methylene-3-cyclohexen-1-yl)-2-butanone while it is being applied to the homogenized tobacco or homogenized tobacco sheet. Also, other flavor and aroma producing additives, such as:

(a) Esters, for example:
Ethyl butyrate;
Ethyl acetate;
Ethyl valerate;
Amyl acetate;
Phenyl ethyl isovalerate; and
Methyl heptynyl carbonate
(b) Aldehydes, for example:
3-phenyl-2-pentenal;
3-phenyl-3-pentenal;

Phenyl acetaldehyde;
Cinnamaldehyde; and
Beta-ethyl-cinnamaldehyde
(c) Ketones, for example:
Benzylidene acetone;
Acetophenone;
Maltol; and
Ethyl maltol
(d) Acetals, for example:
3-phenyl-4-pentenal dimethyl acetal; and
3-phenyl-4-pentenal diethyl acetal (described in copending application for U.S. Pat. No. 276,922 filed on August 1, 1972)
(e) Natural oils and extracts, for example:
Vanilla;
Coffee extract;
Origanum oil;
Cocoa extract;
Oil of cloves;
Nutmeg oil;
Celery seed oil;
Bergamot oil; and
Ylang-ylang oil
(f) Lactones, for example:
Delta-decalactone;
Delta-undecalactone;
Delta-dodecalactone;
Gamma-undecalactone; and
Coumarin
(g) Ethers, for example:
Dibenzyl ether;
Vanillin; and
Eugenol
(h) Pyrazines, for example:
2-Acetyl pyrazine;
2-Acetyl-6-methyl pyrazine;
2-Ethyl pyrazine;
2,3-Dimethyl pyrazine;
2,5-Dimethyl pyrazine; and
2-Ethyl-5-methyl pyrazine
(i) Pyrroles, for example:
N-cyclopropyl pyrrole; and
N-cyclooctyl pyrrole
(j) Pyrones, for example:
6-n-propyl-alpha-pyrone
6-n-butyl-alpha-pyrone
6-i-butyl-alpha-pyrone
6-i-propyl-alpha-pyrone
as well as those additives disclosed in U.S. pat. Nos. 2,766,145; 2,905,575; 2,905,576; 2,978,365; 3,041,211; 2,766,149; 2,766,150; 3,589,372; 3,288,146; 3,402,051 and 3,380,457 as well as Australian pat. Nos. 444,545; 444,507 and 444,389 may be incorporated into the homogenized tobacco sheet and-/or the ultimate tobacco mixture with the butanone derivative of this invention.

The following examples are given to illustrate the embodiments of the invention as it is presently preferred to practice it. It will be understood that these examples are illustrative and the invention is not to be considered as restricted thereto except as indicated in the appended claims.

EXAMPLE I Preparation of Mixture of 4-(2,6,6-Trimethyl-1,3-Cyclohexadien-1-Yl)-2-Butanone and 4-(6,6-Dimethyl-2-Methylene-3-Cyclohexen-1-yl)-2-Butanone Into a 50 ml three-neck flask equipped with reflux condenser, thermometer, magnetic stirrer, addition funnel and nitrogen purge, the following materials are added:

| Ingredients | Parts by Weight |
|---|---|
| Alpha-Dihydro Ionone having the structure: 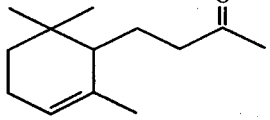 | 9.6 grams |
| Quinoline | 3.2 grams |
| Chloroform | 25 ml |

The resulting mixture is cooled in an ice-sodium chloride bath and a mixture of 32 grams of bromine and 9 ml chloroform is added drop-wise with stirring over a half hour period. The reaction mass is then stirred at 5°C for a period of 5 hours and then concentrated under reduced pressure. The resulting residue is then heated on a steam bath for a period of 3 hours after 11 ml of N,N-Diethyl-aniline has been added to the residue. After 3 hours 2.5 ml pyridine is then added to the reaction mass and heating is continued for ½ hour longer. To the cooled reaction mixture are added 50 ml of 5 N Hydrochloric acid. The aqueous layer is then extracted with three 100 ml portions of n-pentane. The combined pentane extracts are washed with two 50 ml portions of 5 N hydrochloric acid, then two 50 ml 10% sodium bicarbonate solution portions and two 100 ml portions of distilled water. The pentane extracts are then evaporated after drying over anhydrous sodium sulfate yielding (confirmed by infrared and mass spectral analysis) a mixture containing 90% 4-(2,6,6-trimethyl-1,3-cyclohexadien-1-yl)-2-butanone and 10% 4-(6,6-dimethyl-2-methylene-3-cyclohexen-1-yl)-2-butanone (over-all yield: 8.8%). The 90:10 mixture of 4-(2,6,6-trimethyl-1,3-cyclohexadien-1-yl)-2-butanone and 4-(6,6-dimethyl-2-methylene-3-cyclohexen-1-yl)-2-butanone distills at 65°C and at 15 mm Hg. pressure.

EXAMPLE II

The following tabacco flavor formulation A is prepared:

| Ingredients | Parts by Weight |
|---|---|
| Ethyl Butyrate | .05 |
| Ethyl Valerate | .05 |
| Maltol | 2.00 |
| Cocoa Extract | 26.00 |
| Coffee Extract | 10.00 |
| EtOH | 20.00 |
| Water | 41.90 |

A tobacco formulation B is prepared as follows:

| Ingredients | Parts by Weight |
|---|---|
| Bright | 40.1 |
| Burley | 24.9 |
| Maryland | 1.1 |
| Turkish | 11.6 |
| Stem (flue-cured) | 14.2 |
| Glycerine | 2.8 |
| Water | 5.3 |

The flavor formulation A is added to a portion $B_1$ of the smoking tobacco formulation at the rate of 0.1% by weight of the tobacco. The flavored and non-flavored tobacco formulations are then formulated into cigarettes by the usual manufacturing procedures:

i. At the rate of 20 ppm to one quarter of the cigarettes in each goup is added 4-(2,6,6- trimethyl-1,3-cyclohexadien-1-yl)-2-butanone or 4-(6,6-dimethyl-2-methylene-3-cyclohexen-1-yl)-2-butanone. The use of the 4-(2,6,6-trimethyl-1,3-cyclohexadien-1-yl)-2-butanone or 4-(6,6-dimethyl-2-methylene-3-cyclohexen-1-yl)-2-butanone enhances the natural character causing the tobacco to be less harsh, more aromatic and to have a very natural-like sweet taste and aroma on smoking whether or not the other flavor ingredients of Formulation A are present.

ii. At the rate of 40 ppm to one quarter of the cigarettes in each group is added 4-(2,6,6-trimethyl-1,3-cyclohexadien-1-yl)-2-butanone or 4-(6,6-dimethyl-2-methylene-3-cyclohexen-1-yl)-2-butanone. The use of the 4-(2,6,6-trimethyl-1,3-cyclohexadien-1-yl)-2-butanone or 4-(6,6-dimethyl-2-methylene-3-cyclohexen-1-yl)-2-butanone at this level also causes the tobacco to have a distinct and natural sweet flavor and aroma; much more natural and sweet and less harsh in the smoke with more body than the same formulation without the 4-(2,6,6-trimethyl-1,3-cyclohexadien-1-yl)-2-butanone or 4-(6,6-dimethyl-2-methylene-3-cyclohexen-1-yl)-2-butanone prior to smoking and on smoking, whether or not other flavoring ingredients of Formulation A are present therein.

EXAMPLE III

The following tobacco flavor formulations A and B are prepared:

| (A) | Ingredients | Parts |
|---|---|---|
| | Ethyl butyrate | 0.05 |
| | Ethyl valerate | 0.05 |
| | Maltol | 2.00 |
| | Cocoa extract | 26.00 |
| | Coffee extract | 10.00 |
| | Ethanol (95% aqueous) | 20.00 |
| | Water | 41.90 |
| (B) | Ingredients | Parts |
| | Ethyl butyrate | 0.05 |
| | Ethyl valerate | 0.05 |
| | Maltol | 2.00 |
| | Cocoa extract | 26.00 |
| | Coffee extract | 10.00 |
| | Ethanol (95% aqueous) | 20.00 |
| | Water | 41.90 |
| | 90:10 mixture of 4-(2,6,6-trimethyl-1,3-cyclohexadien-1-yl)-2-butanone and 4-(6,6-dimethyl-2-methylene-3-cyclohexen-1-yl)-2-butanone produced according to Example I | 25.00 |

A homogenized tobacco formulation C is prepared as follows:

| Ingredients | Parts |
|---|---|
| Tobacco Scrap | 100 |
| Burley Tobacco Stems | 33.3 |
| Virginia Tobacco Stems | 66.7 |
| Carboxymethyl cellulose | 2.0 |
| Diammonium phosphate | 15.0 |
| Glycerine | 12.0 |
| Water | 3600 |

The flavor formulations A and B are each added to individual portions of the homogenized tobacco formulation C at the rate of 0.1% by weight of the homogenized tobacco. The flavored and non-flavored homogenized tobacco formulations (containing i A, ii B and iii no additional flavor) are then admixed with the following tobacco mixture D in the ratio C:D of 15:85:

| (D) | Ingredients | Parts by Weight |
|---|---|---|
| | Bright tobacco | 40.1 |
| | Burley tobacco | 24.9 |
| | Maryland tobacco | 1.1 |
| | Turkish tobacco | 11.6 |
| | Stem (flue-cured) tobacco | 14.2 |
| | Glycerine | 2.8 |
| | Water | 5.3 |

Each of mixtures i, ii and iii are then formulated into cigarettes.

The use of the 90:10 mixture of 4-(2,6,6-trimethyl-1,3-cyclohexadien-1-yl)-2-butanone and 4-(6,6-dimethyl-2-methylene-3 -cyclohexen-1-yl)-2-butanone in the cigarettes causes the cigarettes prior to smoking to have a sweet, natural tobacco-like aroma. On smoking the cigarettes containing the 90:10 mixture of 4-(2,6,6-trimethyl-1,3-cyclohexadien-1-yl)-2-butanone and 4-(6,6-dimethyl-2-methylene-3-cyclohexen-1-yl)-2-butanone are found relative to those cigarettes not containing 90:10 mixture of 4-(2,6,6-trimethyl-1,3-cyclohexadien-1-yl)-2-butanone and 4-(6,6-dimethyl-2-methylene-3-cyclohexen-1-yl)-2-butanone to be richer, sweeter, more natural and less harsh whereas cigarettes not containing 90:10 mixture of 4-(2,6,6-trimethyl-1,3-cyclohexadien-1-yl)-2-butanone and 4-(6,6-dimethyl-2-methylene-3-cyclohexen-1-yl)-2-butanone do not have these notes.

It will be understood by those skilled in the art from the foregoing description that alphapyrones of our invention can be used in the preparation of a wide variety of homogenized tobacco flavors and tobacco products containing same.

We claim:

1. A process for altering the organoleptic properties of tobacco which comprises adding to said tobacco from 10 ppm up to 500 ppm by weight of said tobacco of at least one ketone compound selected from the group consisting of 4-(2,6,6-trimethyl-1,3-cyclohexadien-1-yl)-2-butanone and 4-(6,6-dimethyl-2-methylene-3-cyclohexen-1-yl)-2-butanone.

2. An organoleptically improved smoking tobacco product comprising smoking tobacco material encased in a wrapper and a flavor and aroma additive applied to said product in an amount of from 10 ppm up to 500 ppm based on the weight of said product, which includes as an active ingredient at least one ketone compound selected from the group consisting of 4-(2,6,6-trimethyl-1,3-cyclohexadien-1-yl)-2-butanone and 4-

(6,6-dimethyl-2-methylene-3-cyclohexen-1-yl)-2-butanone.

3. The method of making an organoleptically improved smoking tobacco product which comprises applying to the product in an amount of from 10 ppm up to 500 ppm based on the weight of said product of an aroma and flavoring additive which includes as an active ingredient at least one ketone compound selected from the group consisting of 4-(2,6,6-trimethyl-1,3-cyclohexadien-1-yl)-2-butanone and 4-(6,6-dimethyl-2-methylene-3-cyclohexen-1-yl)-2-butanone.

4. The tobacco product of claim 2 wherein the ketone compound is 4-(2,6,6-trimethyl-1,3-cyclohexadien-1-yl)-2-butanone.

5. The method of claim 3 wherein the ketone compound is 4-(2,6,6-trimethyl-1,3-cyclohexadien-1-yl)-2-butanone.

6. A process for altering the organoleptic properties of tobacco comprising the step of adding to tobacco, homogenized tobacco containing a flavoring composition comprising a butanone derivative selected from the group consisting of:
   i. 4-(2,6,6-trimethyl-1,3-cyclohexadien-1-yl)-2-butanone;
   ii. 4-(6,6-dimethyl-2-methylene-3-cyclohexen-1-yl)-2-butanone; and
   iii. 90:10 weight:weight mixture of 4-(2,6,6-trimethyl-1,3-cyclohexadien-1-yl)-2-butanone and 4-(6,6-dimethyl-2-methylene-3-cyclohexen-1-yl)-2-butanone and at least one tobacco flavoring additive selected from the group consisting of:
Esters;
Pyrones;
Aldehydes;
Ketones;
Acetals;
Natural oils and extracts;
Lactones;
Ethers;
Pyrazines; and
Pyrroles;
the concentration of said butanone derivative in said combined tobacco and homogenized tobacco being from 10 ppm up to 500 ppm.

7. A tobacco article comprising homogenized tobacco, tobacco and a butanone derivative selected from the group consisting of:
   i. 4-(2,6,6-trimethyl-1,3-cyclohexadien-1-yl)-2-butanone;
   ii. 4-(6,6-dimethyl-2-methylene-3-cyclohexen-1-yl)-2-butanone; and
   iii. 90:10 weight:weight mixture of 4-(2,6,6-trimethyl-1,3-cyclohexadien-1-yl)-2-butanone and 4-(6,6-dimethyl-2-methylene-3-cyclohexen-1-yl)-2-butanone,
the concentration of said butanone derivative in the combined homogenized tobacco and tobacco being from 10 ppm up to 500 ppm.

8. The tobacco article of claim 6 wherein the ratio of homogenized tobacco to tobacco is about 85:15.

* * * * *